US006424320B1

(12) United States Patent
Callway

(10) Patent No.: US 6,424,320 B1
(45) Date of Patent: Jul. 23, 2002

(54) METHOD AND APPARATUS FOR RENDERING VIDEO

(75) Inventor: Edward G. Callway, Toronto (CA)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/333,736

(22) Filed: Jun. 15, 1999

(51) Int. Cl.$^7$ .............................................. G09G 5/00
(52) U.S. Cl. ........................................................ 345/1.1
(58) Field of Search ........................... 345/1, 5, 30, 1.1, 345/1.2, 1.3; 348/516, 521, 522

(56) References Cited

U.S. PATENT DOCUMENTS

| 4,862,156 A | * | 8/1989 | Westberg et al. ........... 345/133 |
| 5,185,858 A | | 2/1993 | Emery et al. |
| 5,799,204 A | | 8/1998 | Pesto, Jr. |
| 6,028,643 A | * | 2/2000 | Jordan et al. ............... 348/552 |
| 6,100,936 A | * | 8/2000 | Jordan et al. ............... 348/552 |

FOREIGN PATENT DOCUMENTS

| EP | 0 579 402 A1 | 1/1994 |
| WO | WO 97 14133 A | 4/1997 |

OTHER PUBLICATIONS

Synchronus Digital Video Switch, IBM Technical Disclosure Bulletin, Sep. 1, 1991, pp. 265–270, vol. 34, No. 4B, IBM Corp., New York, NY, USA.

Partial European Search Report for EP 00 30 5076, Communication, Sep. 6, 2001, 1–5, European Patent Office, The Hague, Netherlands.

International Search Report for PCT/US 96/15583, Jul. 14, 1997, 1–6, European Patent Office, The Hague, Netherlands.

* cited by examiner

*Primary Examiner*—Richard Hjerpe
*Assistant Examiner*—Ronald Laneau
(74) *Attorney, Agent, or Firm*—Vedder, Price, Kaufman & Kammholz

(57) ABSTRACT

Multiple Video Graphic Adapters (VGAs) are used to render video data to a common port. In one embodiment, each VGA will render an entire frame of video and provide it to the output port through a switch. The next adjacent frame will be calculated by a separate VGA and provided to an output port through the switch. A voltage adjustment is made to a digital-to-analog converter(DAC) of at least one of the VGAs in order to correlate the video-out voltages being provided by the VGAs. This correlation assures that the color being viewed on the screen is uniform regardless of which VGA is providing the signal. A dummy switch receives the video-output from each of the VGAs. When a VGA is not providing information to the output port, the dummy switch can be selected to provide the video-output of the selected VGA a resistance path which matches the resistance at the video port. This allows the video graphics controller to maintain a constant thermal state.

25 Claims, 4 Drawing Sheets

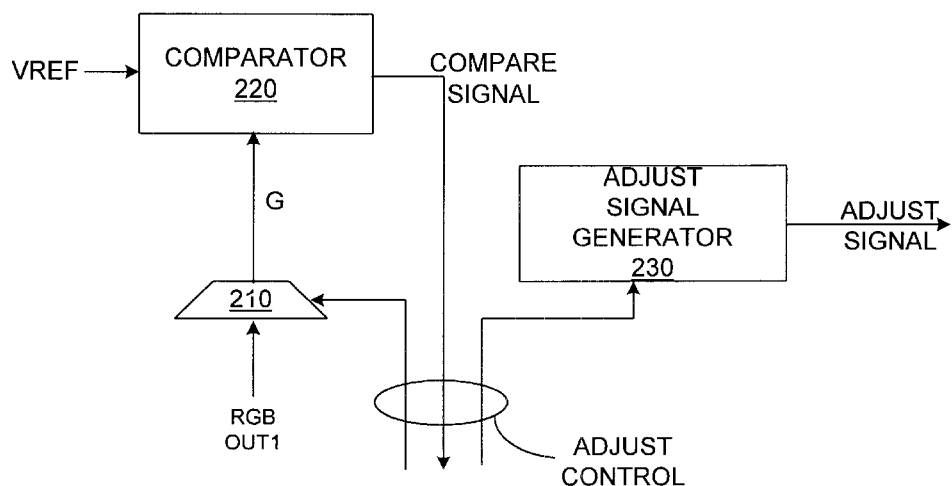
FIG. 2
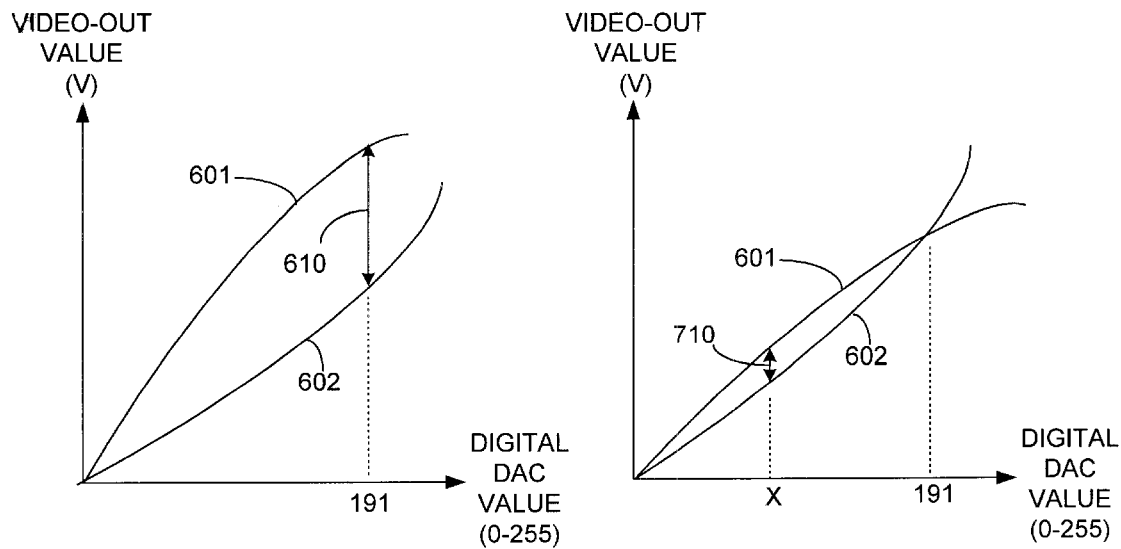
FIG. 6
FIG. 7

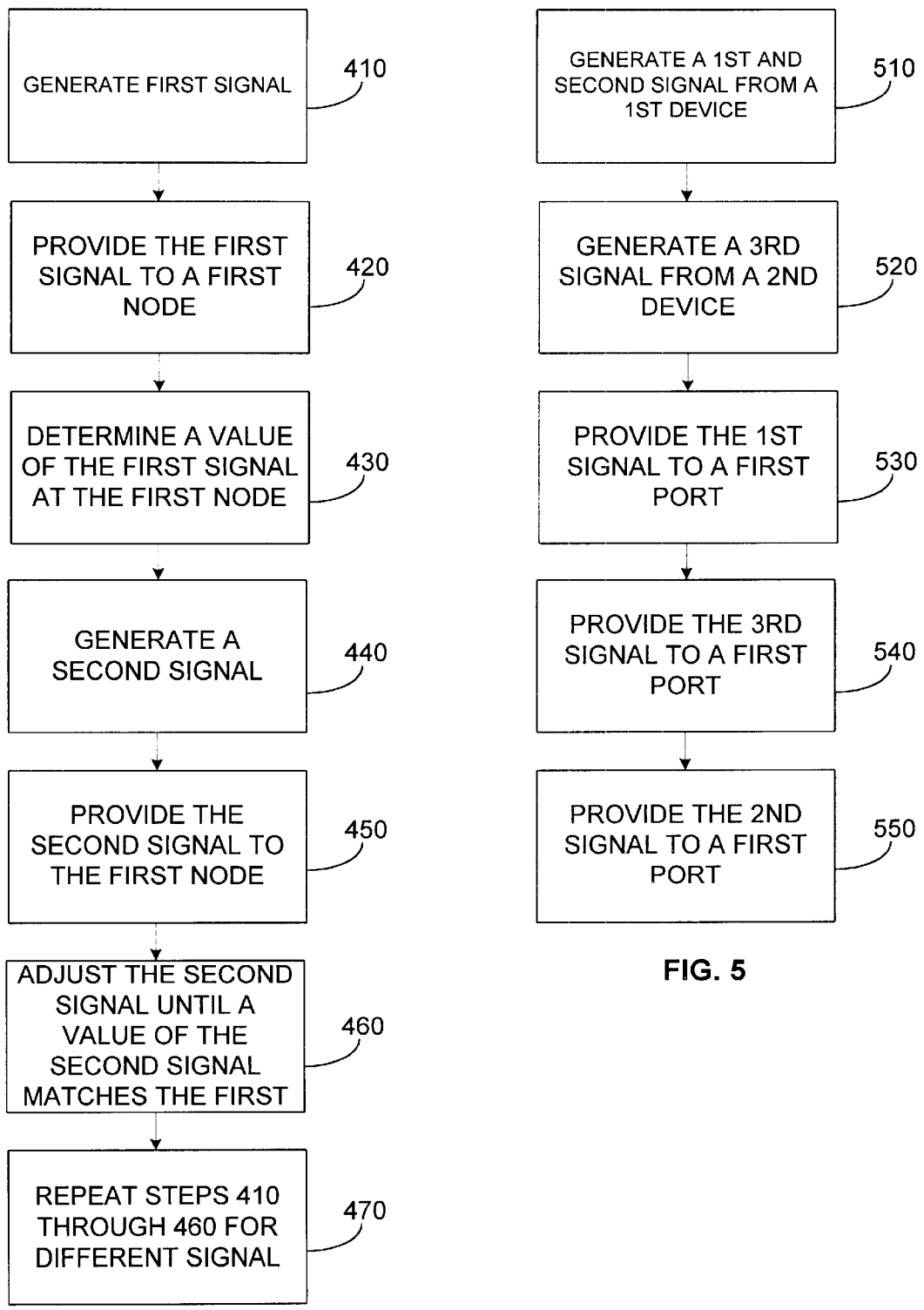

METHOD AND APPARATUS FOR RENDERING VIDEO

FIELD OF THE INVENTION

The present invention generally describes a method and apparatus for providing video signals and more specifically describes a method and apparatus for rendering video signals from multiple video adapters.

BACKGROUND OF THE INVENTION

Video graphic adapters (VGA) are used to render video signals to be displayed on display devices such as computer monitors. In operation, VGAs will generally receive graphics information from a system, such as a computer system, and perform the necessary graphics calculations upon the received information in order to render graphics signals. Graphics calculations are performed for many different types of information, including lighting information, user view information, texture information, and Z-plane data information, which indicates where one device is relative to another device. Once all calculations have been performed upon an object, the data representing the object to be displayed is written into a frame buffer. Once the graphics calculations have been repeated for all objects associated with a specific frame, the data stored within the frame buffer is rendered to create a video signal that is provided to the display device.

The amount of time taken for an entire frame of information to be calculated and provided to the frame buffer becomes a bottleneck in a video graphics system as the calculations associated with the graphics become more complicated. Contributing to the increased complexity of the graphics calculations is the increased need for higher resolution video, as well as the need for more complicated video, such as 3-D video or stereoscopic video. The video image observed by the human eye becomes distorted or choppy when the amount of time taken to provide an entire frame of video exceeds the amount of time which the display must be refreshed with a new graphic, or new frame, in order to avoid perception by the human eye.

The use of multiple graphic adapters has been proposed in order to provide data to the frame buffer at a rate fast enough to avoid detection by the human eye. Current methods of using multiple graphics devices have partitioned the graphics associated with each such that each one of the multiple processors is responsible for rendering a portion of each frame. Each processor renders a portion of a frame in order to assure data is provided to the frame buffer within a required amount of time.

Once such partitioning method split the screen into odd and even display lines, whereby one video adapter would render all of the odd lines associated with a specific frame, while the second device would render all of the even lines associated with the frame. Another prior art method split the screen into two discrete areas, such as a top and a bottom half, whereby each display device would be responsible for rendering one portion of the screen. However, problems with these implementations occur.

One problem with present implementations is that all of the video data from the system needs to be sent to both of the data graphics devices. For example, in the implementation where the graphics device split the odd and even lines it is necessary for each video device to receive the object's video information from the system. The amount of data sent by the system to the graphics adapters in effect doubles, because each graphics adapter needs all the information. In an implementation where the data is be sent to both devices at the same time, there is hardware and/or software overhead associated with controlling the reception of the data.

Workload distribution is another problem associated with known graphics systems having multiple adapters. When each of the two graphics devices is processing a portion of a single frame, a likelihood exists that the amount of work to be done by one of the processors for a given frame will be significantly greater than the amount of work being done by the other video device. For example, where a first video device is to render the video for the top half of the screen, it is likely that it will have fewer calculations to perform than the device calculating the graphics for the bottom half of the frame. One reason for this disparity in workload distribution is because it is common for the top half of a frame to contain skyscape information which is less computationally intensive than for the objects associated with action video often found on the bottom half of a display device or frame. When the workload distribution is not even, one graphics device will in effect end up stalling while the second graphics device completes its calculations. This is inefficient.

Yet another problem associated with the prior embodiments is that each of the graphics devices has to calculate the shape of each and every object on the frame. Each device must calculate each object's shape in order to determine whether or not the object, or a portion of the object, must be further processed by the graphics engine associated with the graphics device. An associated problem is that when an object straddles the demarcation line between an area that the first graphics device is to process and an area that the second graphics device is to process, it is necessary for both devices to process the object. For example, when a portion of an object is in the top half of the screen, and a portion on the bottom half of the screen, calculations associated with the object are calculated by both graphic devices.

Yet another problem with the known implementations of multiple graphic devices is the need to carefully match the digital-to-analog converters (DACs) associated with each VGA. The DACs of each VGA provide a plurality of voltages, one for each video component, such as the red/green/blue components. If the DACs are not carefully matched, it is possible for colors viewed on a display device to have slightly different shades of color because of the lack of calibration between the devices' DACs.

Therefore, it would be desirable to have a method and apparatus that allows the use of multiple video graphics devices that overcome the problems associated with the prior art.

BRIEF DESCRIPTION OF THE DRAWINGS

FIG. 2 illustrates, in block diagram form, a more detailed view of the video-out adjust portion of FIG. 1;

FIGS. 4 and 5 illustrate, in flow diagram form, a methods in accordance with the present invention; and FIGS. 6 and 7 illustrate, in graph form, color component transfer curves for two digital-to-analog converters.

DETAILED DESCRIPTION OF THE DRAWINGS

Multiple Video Graphics Adapters (VGAs) are used to render video data to a common port. In one embodiment, a first VGA renders an entire frame of video and provides it to the output port through a switch. The next adjacent frame will be calculated by a separate VGA and provided to the output port through the switch. A voltage adjustment is made to a digital-to-analog converter(DAC) of at least one of the VGAs in order to correlate the video-out voltages being provided by the VGAs. This correlation assures that the color being viewed on the screen is uniform regardless of which VGA is providing the signal. A dummy switch receives the video-output from each of the VGAs. When a VGA is not providing information to the output port, the dummy switch can be selected to provide the video-output of the selected VGA a resistance path which matches the resistance at the video port. This allows the video graphics controller to maintain a constant thermal state to avoid further variations.

Figure 1:
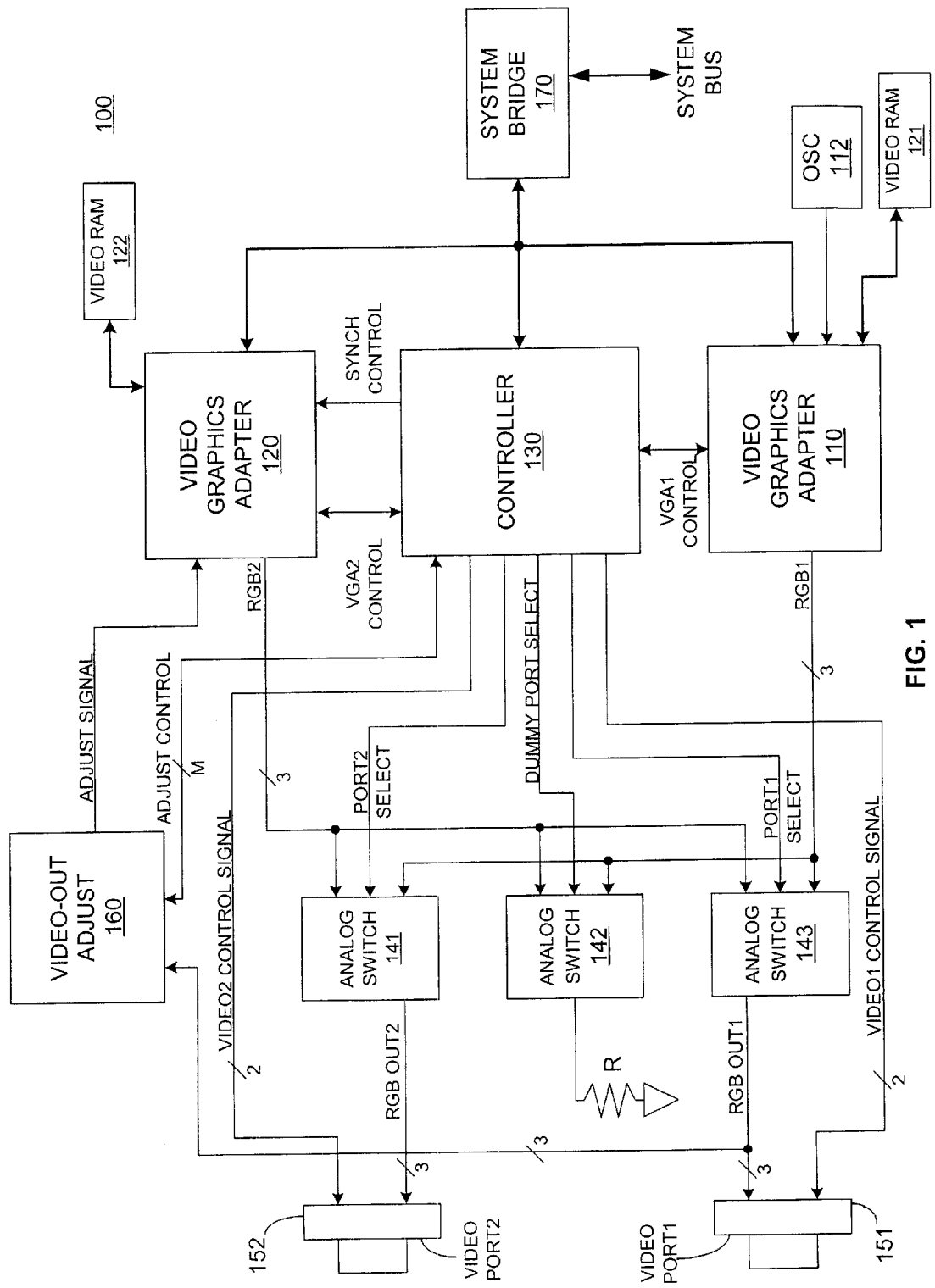
FIG. 1 illustrates, in block diagram form, a system using multiple VGAs in accordance with the present invention.

FIG. 1 illustrates a system 100 having multiple video adapters for providing video signals to one or more video ports. In operation, a system bus labeled SYSTEM BUS provides graphics information from a CPU (not shown), or other system device, to a system bridge 170. The System Bridge 170 is connected to a local bus for providing the system information to the system 100. In a specific embodiment, the SYSTEM BUS and the LOCAL BUS can be PCI (Peripheral Component Interconnect), AGP (Advanced Graphics Port), or any other standard or proprietary busses.

In another embodiment the System Bridge 170 would not be used. By providing appropriate control signaling, the Adapters 110 and 120 can be coupled to a common AGP or PCI bus system bus.

In yet another embodiment, one adapter can be coupled to a PCI bus, while a second adapter would be coupled to an AGP bus. In such a manner, it would be possible to selectively provide a specific frame of data to one adapter or another.

In the implementation of FIG. 1, the LOCAL BUS is connected to a first VGA 110, a second VGA 120, and a Controller 130. Each of the VGAs 110 and 120 are used to render video data to one or both of the Video Ports 151 and 152. In one mode of operation, the first and second VGAs 110 and 120 will provide alternating frames of video to the video port labeled Video Port1, which is also referred to as the First Video Port, and Port 151. In another mode of operation, the first VGA 110 will provide video to Video Port1, while the second VGA 120 will provide a video signal to the video port 152 which is also referred to as the Second Video Port, Video Port2, and Port 152.

It is necessary to synchronize the operations of the VGAs 110 and 120 in order to ensure that the video signals received from VGA 110 and 120 at Video Port1 provide a contiguous video-out signal. In the implementation illustrated, the VGA 110 acts as a master in that it has a dedicated oscillator 112 providing a reference signal. The first VGA 110 is connected to the Controller 130 through the signal labeled VGA1 CONTROL. Included in VGA 1 CONTROL is the vertical synchronization (synch) signal generated by the VGA 110 and the horizontal synchronization signal generated by the VGA 110. The vertical and horizontal synch signals represent periodic signals used by the controller 130 in order to synchronize the vertical and horizontal synch signals of the VGA 120 to those of the VGA 110.

The controller 130 provides a signal labeled SYNCH CONTROL to the VGA 120. The SYNCH CONTROL signal can be a clock signal, whereby the entire VGA operates based on the clock, or it can be some other type of synchronization control mechanism indicating that the generation of a horizontal or vertical synch signal should be sped up or slowed down in order to be synchronized to the VGA 110. In addition, the VGA 120 provides interfaces to the Controller 130 through the signal labeled VGA 2 CONTROL.

The VGA 110 provides a signal labeled RGB1, which represents a plurality of video-output components. In the specific example of FIG. 1, the video-output components include a red color component v), a green color component (G), and a blue color component 15). These video-output components are provided to a first input port of an analog switch 143. In operation, each RGB color component is an analog video-out signal used by to a display device to provide the rendered video. However, in other embodiments, the RG13 data may be digital data provided across multiple lines, digital data provided across a single line, or other combinations of analog and digital data.

VGA 120 also provides color component signals labeled RGB2, which is analogous to the RGB1 signal discussed above. The RGB2 signal is provided to a second input port of switch 143 and a second input port of switch 141. In addition, each of the signals RBG 1 and RGB2 are provided respectively to the first and second input port of switch 142.

Switch 143 receives a select signal labeled PORT1 SELECT from Controller 130 to indicate which of the received color component signals RGB1 and RGB2 should be provided to the port 151. The output of switch 143 is labeled RGB OUT1. Likewise, the switch 141 is connected to the Controller 130 to receive a signal labeled PORT2 SELECT. The PORT2 SELECT signal will select one of the color component signals RGB1 or RGB2. The output port of switch 141 is labeled RGB OUT2. It will be recognized by one of ordinary skill in the art that in other embodiments, it will be possible for only one of the video-out ports to have access to both of the VGAs. For example, it would be possible for only Video Port1 to receive RGB signals from both the VGA 110 and the VGA 120.

The switch 142 operates as a "dummy" switch in that in the embodiment shown it does not provide data to a user accessible video-out port. The video switch 142 is controlled by Controller 130. In operation, the Controller 130 selects the VGAs RGB signal from the VGA that is not driving video to an output port. This allows for the VGA to provide a signal to the dummy switch, allowing for thermal consistency to be maintained by the VGAs when not driving a user accessible signal. In other words, when a VGA is not currently driving either Video Port1 or Video Port2, its RGB signal would be selected by switch to drive the resistor R. The resistance value of the resistor R would be such that it would be approximately equal to that seen by the video-output ports 151, and 152. In this implementation, the load seen by a VGA at its RGB output port would be approximately the same whether or not it is actively driving user accessible video or driving merely the dummy load labeled R.

In the specific implementation illustrated in System 100, the RGB OUT1 signal is received by a Video-Out Adjust 160. The Video-Out Adjust Portion 160 provides at least one signal labeled ADJUST CONTROL to the Controller 130. The signal ADJUST CONTROL is illustrated to be a bus of size M, in that multiple signals can be represented. In addition, the Video-Out Adjust 160 provides a signal labeled Adjust Signal to the VGA 120.

FIG. 2 illustrates the Video-Out Adjust 160 in greater detail. The RGB OUT1 signal is received by a portion labeled Multiplexor 210. Based on a select input, one of the RGB signals received from Video Port1 is provided to the Comparator 220. In the example illustrated, the signal provided is labeled G, representing that the green component has been selected. In a specific embodiment, where only a single color component is to be adjusted, green is generally preferred, because green represents approximately 60% of the brightness of all color components in typical video-output.

The Comparator 220 receives the signal G and a voltage reference signal labeled VREF. VREF represents a voltage to which the color component signal G is to be compared. In a specific embodiment, the VREF signal is chosen to have a value approximately three-quarters of the maximum voltage value that the color component signal G can obtain. In other words, if 0.7 volts is the maximum value that the color component signal G can obtain, the VREF value will be chosen to be approximately 75% of 0.7 volts. In other embodiments, other voltage values can be used.

The Comparator 220 provides an output signal labeled COMPARE SIGNAL. The COMPARE SIGNAL will indicate when a match occurs between the voltage of the color component signal G and the VREF signal. In general, the COMPARE SIGNAL will toggle from an inactive state indicating the signals do not match to an active state indicating that the signals have matched. It will be understood by one of ordinary skill in the art that if the Comparator 220 were to comprise a simple differential amplifier, the COMPARE SIGNAL would maintain the active state indicating a match, even when the green signal attains a voltage level significantly higher than the VREF signal. In other words, in the embodiment illustrated, the toggling of the signal COMPARE SIGNAL from one state to another indicates a match has occurred. The signal labeled ADJUST CONTROL is received by the Adjust Signal Generator 230. The Adjust Signal Generator 230, in response to a signal from Control 130 received as part of the ADJUST SIGNAL CONTROL, provides a signal labeled ADJUST SIGNAL. In a specific embodiment, the ADJUST SIGNAL GENERATOR 230 is a variable reference source. The ADJUST SIGNAL provides a value for calibrating the DAC values of at least one of the VGAs.

The VGA 110 is connected to a VIDEO RAM 121, which store information, such as frame buffer and color pallete information, associated with the VGA 110. In a similar manner, the VGA 120 is connected to a VIDEO RAM 122 which will be maintain frame buffer and color pallete information associated with the VGA 120.

Figure 3:
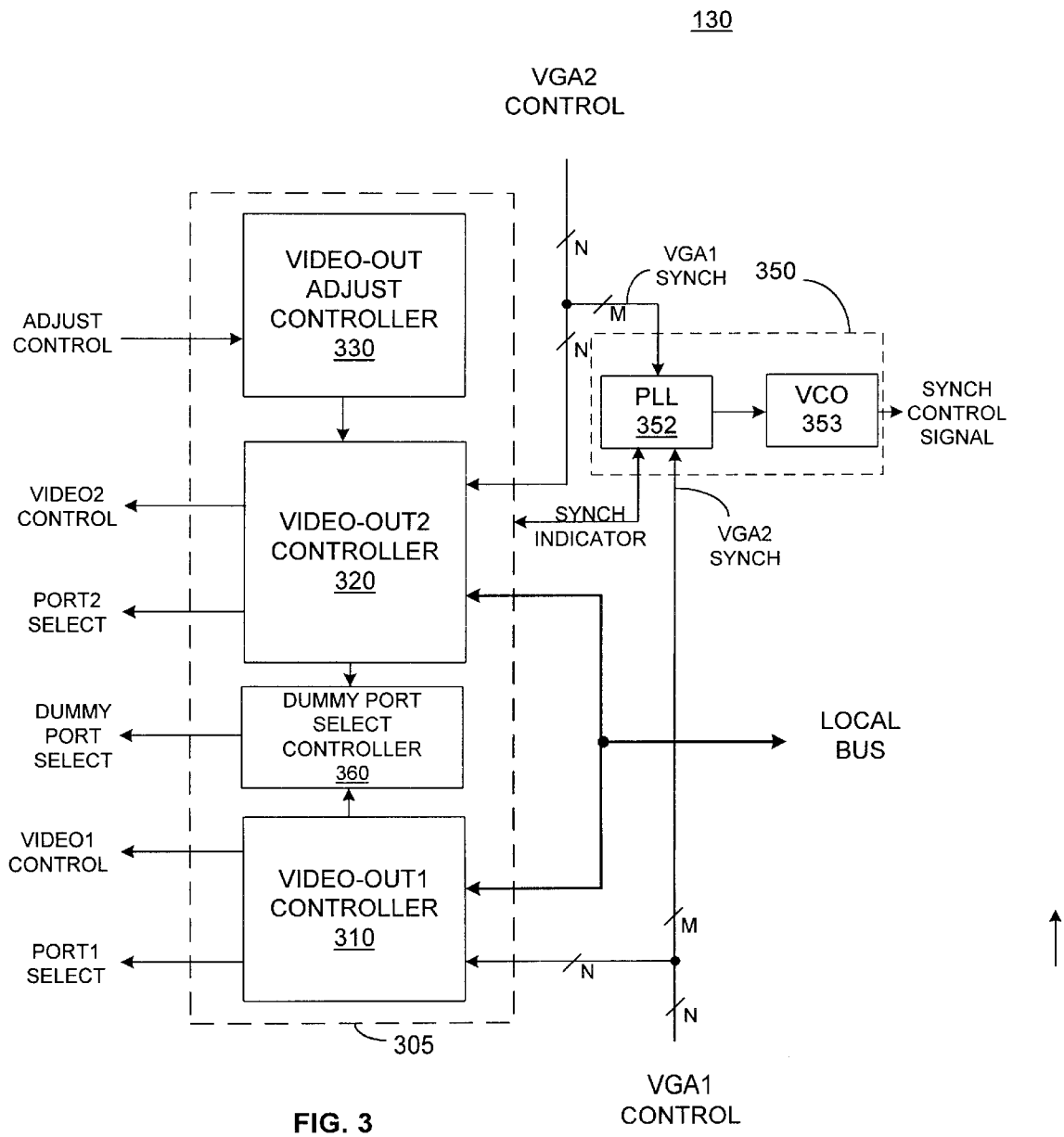
FIG. 3 illustrates, in block diagram form, a more detailed view of the controller of FIG. 1.

FIG. 3 illustrates a specific implementation of the controller 130. The controller 130 includes a Video-Out1 Controller 310, a second video-out controller labeled Video-Out2 Controller 320, a Video-Out Adjust Controller 330, and a synchronize device 350.

In operation, at least a portion of the VGA1 CONTROL signal is received by the first video controller 310. As illustrated, the VGA1 CONTROL signal comprises N signals that are received by the first video-out controller. In addition, the VGA1 Control signals are received by the Synchronize Device 350. It should be noted that M and N may be the same value. Likewise, the signal VGA2 CONTROL is received by the second video-out controller labeled VIDEO OUT2 CONTROL 320, and the Synchronize Device 350. Information transmitted over the LOCAL BUS is also received by the video-out controllers 310 and 320. It should be noted that information over the Local Bus will generally be received by the controller 130 at a single port, whereby the data can be provided to one or both of the two video-out controllers as appropriate.

The first video-out controller 310 provides a first port select signal labeled PORT1 SELECT to the switch 143 in order to provide a color component signal from one of the VGA 110 or 120. Likewise, the second video-out controller 320 provides a signal labeled PORT2 SELECT to the switch 141 in order to select one of the color component signals from the first VGA and the second VGA. The first video-out controller 310 and the second video-out controller 320 respectively provide signals labeled VIDEO1 CONTROL and VIDEO2 CONTROL to the ports 151 and 152 respectively. These video control signals generally include the horizontal and vertical synchronization signals, which are provided with the color component information. Each of the first and second video controllers 310 and 320 can provide requests to the Dummy Port Select Controller 360. When requested, the Dummy Port Select Controller 360 selects one of the two color component signals through switch 142 to be provided to the load resistor R.

The controller 130 further includes a synchronization device 350. In the embodiment illustrated, the vertical and/or horizontal synchronization signals are received by the phase locked loop (PLL) 352 from each of the first VGA 110, and the second VGA 120. By synchronizing the vertical and horizontal synchronization signals of each VGA, it is possible to use a voltage-controlled oscillator 353 in order to provide a synchronization control signal. In the specific example illustrated, the signal labeled SYNCH CONTROL SIGNAL is provided to the VGA 120, and will generally be a clock signal that can be sped up or slowed down based upon the desired synchronization.

In other embodiments, the synchronization device 350 can be used to indicate to one and/or both of the controllers 310 and 320 when to delay by one or more clock cycles, or when to advance the synchronization output by one or more clock cycles. In this manner, it is possible to maintain synchronization between the devices.

The basic operation and connectivity of FIGS. 1 through 3 has been described. Specific operation of the System 100 will be described with respect to the methods put forth in FIGS. 4 and 5 with reference to FIGS. 1 through 3.

FIG. 4 illustrates a method in accordance with the present invention. At step 410 a first signal is generated at a first video graphics device. With reference to FIG. 1, this would be representative of the RGB1 signal being generated by the VGA 110. The RGB1 signal comprises three separate color components, red, green and blue. In other embodiments, the VGA 110 can provide other color components besides the RGB signal. For example, YUV color components, or any other standard color components, or proprietary color components can be provided.

At step 420, the first signal is provided to a first node. With reference to FIG. 1, the node is one of the plurality of nodes carrying the RGB1 signal. It should be noted that in the embodiment illustrated, that the RGB1 signal is provided to a bus comprising three nodes, one for each color component. Likewise, the RGB2 signal is provided to a bus comprising a node for each color component.

Next, at step 430, a value associated with the first signal and the first output node is determined. With reference to FIGS. 1 and 2, the signal RGB OUT1 is provided to the Multiplexor 210 of FIG. 2. One of the RGB signals is chosen at the analog Multiplexor 210 of FIG. 2, and provided to the Comparator 220. In the specific implementation illustrated, the values of the color components associated with the RGB OUT1 signal are voltage values. In other implementations, values other than voltages, i.e. current values, can be provided to Video-Out Adjust 160 of FIG. 1. A specific implementation for determining the value during step 430 is to have the first VGA 110 change the value of the monitored color component (green in this example) until the value received at Comparator 220 matches VREF. This is accomplished by having the Controller 130 indicate to the VGA 110 to change the digital value of the DAC. By changing the digital DAC value the value received at the Comparator 220 of FIG. 2 will also change. By monitoring the compare signal associated with the Comarator 220, the digital DAC value at which the first signal in step 420 matches VREF can be determined.

At step 440, a second signal is generated at a second graphics device. With reference to FIG. 1, the signal being generated would be the RGB2 signals by VGA 120. When the RGB1 signal and the RGB2 signals are to provide alternating frames of video to Video Port1, it is necessary to compensate the values of the two VGAs 110 and 120 so that their RGB output values are approximately the same for given digital DAC value. If the output voltages of RGB1 and RGB2 are not the same for a given DAC value, variations in color will be detectable when switching occurs between VGAs 110 and 120. Therefore, at step 440, the color component signal that is to be calibrated to the first signal will be generated using the value determined in step 430.

At step 450, the second signal from stage 440 is provided to the first output node. In operation, this requires the controller 130 of FIG. 1 to select the second VGA 120 using switch 143. This allows the color component signal being calibrated to be provided as RGB OUT1.

At step 460, an adjustment is made to the second VGA device until the value of the second signal, at the first output node, substantially matches the predetermined voltage reference value VREF. This corresponds to varying the ADJUST SIGNAL of FIG. 1. The ADJUST SIGNAL is used to bias the VGA 120 in order to calibrate the color component signal. The ADJUST SIGNAL is varied until the color component value being calibrated VGA2 120 matches the VREF value to which the same color component value of VGA1 110 was calibrated.

At a step 470, the steps 410 through 460 are repeated for different color components signals, and/or different VREF values.

FIGS. 6 and 7 illustrate the effects of the method of FIG. 5 on a specific color component. FIG. 6 illustrates along the X-axis the digital DAC value of a specific color component. For example, the specific color component can be the green signal provided by an 8-bit DAC associated with the VGA 110. For purposes of illustration, the curve 601 represents the actual analog value of the color component at the RGB OUT1 as generated by the DAC output of the system 100 of FIG. 1.

As illustrated, the curve 601 is not necessarily a linear curve, because the analog output values of the DAC can vary over the DAC's range. Likewise, the curve 602 represents the analog value of the color component provided at the output from the second VGA 120 for the range of digital DAC values. Range 610 represents the difference between the curves 601 and 602 at a digital DAC value of 191. The value 191 represents 75% of the maximum DAC value of 255. In general, the signal difference 610 will be referenced in terms of a voltage value. By implementing the methods disclosed herein, the voltage difference 610 can be minimized.

FIG. 7 illustrates how calibrating the DACs to a single VREF value will affect the curves 601 and 602. While FIG. 7 illustrates that the voltage difference 610 at the value 191 has been substantially eliminated, other voltage differences still exist at other points in the curve, such as the voltage difference 710 illustrated to reside at the digital DAC value of X.

One of ordinary skill in the art will recognize that by changing the voltage reference value, and allowing for multiple adjustments at various curve points, it would be possible to adjust for the other value such as 710 as well. In another implementation, the video-out controller 330 can provide information to a video pallete which can be stored in video ram or within the VGAs 110 and 120. For example, a video pallete associated with the VGA 120 can be stored in the Video Ram 122 or within the VGA 120. Such a pallete provides the colors available for output by the DAC. By storing the pallete colors in a piecewise manner, such as a piecewise linear representation, it is possible to adjust the actual color displayed based upon the desired brightness. This can be accomplished by making a coarse adjustment to minimize the voltage difference 610, as illustrated in FIG. 7, followed by adjusting the brightness of each individual pallete member in order to reduce other voltage differences, such as voltage difference 710 of FIG. 6. A peicewise linear representation of each pallete member can be used to represent each pallete color over its brightness range, thereby minimizing voltage differences accross the entire brightness.

One way to adjust the palette members is to vary the voltage reference VREF illustrated in FIG. 2 in order to determine the color component differences at different brightness such as at the DAC value X of 710. By doing so, similar palette representations of each VGA can be adjusted relative to one another. For example, 710 can be minimized by having the palette member or members providing values at X be adjusted to a brighter or lesser color until the displayed color from both DACs is the same. This technique will minimize 710.

The specific method of FIG. 4 has been put forth with respect to a single color component. One of ordinary skill in the art will recognize that the method can be repeated for each color component. In other words, while it has been illustrated and discussed with reference to green component, the method could be implemented with respect to the blue and red components also. In general, it is desirable to first adjust the green component because statistically it accounts for the largest brightness portion of video observed by the human eye.

The ADJUST CONTROL SIGNAL illustrated in FIG. 1 is used in order to adjust the voltage values provided by the DAC of the second VGA. In general, the video graphic adapters will have DACs, which are capable of producing a value within plus or minus 10%. Therefore, it would be necessary to provide an ADJUST CONTROL SIGNAL capable of implementing a 20% swing in the voltage provided on the color component output of the second VGA 120.

FIG. 5 illustrates another method in accordance with the present invention. At step 510, a first signal is generated representing a first color component of a first frame, and a second signal is generated representative of the first color component for a third frame of video. The first and second signals are both generated on a first VGA. With reference to FIG. 1, the first and second video signals can be generated by the first VGA 110.

At a step 520, a third signal is generated by a second device, such as the second VGA 120. The third signal is also representative of the first color component signal, but for a second frame of video.

At step 530, the first signal is provided to a first port during a first time period. Next, at step 540, the third signal is provided to the first port during a second time period, where the second time period is sequentially adjacent in time to the first time period. Next, at step 550, the second signal is provided to the first port during a third time period, wherein the third time period is sequentially adjacent in time to the second time period. In effect, the steps 530, 540, and 550 provide a first frame of video from the first VGA 110 at the port 151, a second frame of video from the second VGA 120 to the port 151, and a third frame of video from the VGA 110 to the port 151.

In accordance with the present invention, the steps 510 through 550 are advantageous in that the workload distribution is approximately even because each VGA processes an entire frame of video, each frame of data is sent only one time to one VGA, each shape of a frame is calculated only once by one VGA, and there is no straddle data to burden down both processors. In addition, the voltage equalization as described within the method of FIG. 2 also provides the advantage of allowing for even color reproduction regardless of the VGA driving an output port.

It should be further understood that the specific steps of FIGS. 4 and 5 can actually be implemented in hardware and/or in software. For example, the various steps of generating signals can be performed by a hardware engine of the graphics controllers 110 and 120, or the steps can be performed in firmware, such as in microcode, executed on the processing engine associated with the controllers 110 and 120, or it may even be performed fully in software on a central processing unit. In general, a system for rending video may include a processing module and memory. The processing module may be a single processing device or a plurality of processing devices. Such a processing device may be a microprocessor, microcontroller, digital signal processor, microcomputer, portion of the central processing unit, state machine, logic circuitry, and/or any device that manipulates signals (e.g., analog or digital) based on operational instructions. The memory may be a single memory device or a plurality of memory devices. Such a memory device may be a read-only memory, random access memory, floppy disk memory, magnetic tape memory, erasable memory, portion of system memory, and/or any device that stores operational instructions in a digital format. Note that when the processing module implements one or more of its functions via a state machine or logic circuitry, the memory storing the corresponding operational instructions is embedded within the circuitry comprising the state machine and/or logic circuitry.

One of ordinary skill in the art will recognize that variations of the present invention may occur. For example, the present invention can be implemented for a specific color component, or for multiple color components. In addition, the gross color adjust described herein as being performed using the ADJUST SIGNAL from the Video Out Adjust 160, can be accomplished by modifying the video pallete information associated with one or both of the first and second VGA 110 and 120. In addition, the functionality of controller 130 may be incorporated within either or both of adapters 110 and 120. In yet another embodiment, the functionality of Controller 130 can be implemented under software control of the system or one or both of the adapters 110 and 120.

Throughout this specification, the term "connected" has been used in order to indicate the relationship between blocks. It should be understood that while the term "connected" has been used, it would be equally appropriate to have the portions coupled together in that two portions coupled together may have intervening components.

I claim:

1. A video driver system comprising:
   a first graphics device having an input and a first video component output to provide a first video output component signal;
   a second graphics device having an input and a first video component output to provide a first video output component signal;
   a first video output port coupled to the output of the first graphics device and the first video component output of the second graphics device;
   a second video output port coupled to the first video component output of the second graphics device;
   an oscillator coupled to the first graphics device;
   the first graphics device having a periodic output to provide a periodic output signal based upon the oscillator; and
   a synchronizer device having a first input coupled to the periodic output, and having an output coupled to the second graphics device.

2. The system of claim 1, wherein the periodic output signal is a horizontal synchronization signal.

3. The system of claim 1, wherein the periodic output signal is a vertical synchronization signal.

4. The system of claim 1, wherein:
   the second graphics device further comprises a periodic output to provide a periodic output signal based on the oscillator; and
   the synchronizer further comprises a second input coupled to the periodic output of the second graphics device.

5. The system of claim 4 further comprising:
   the synchronizer device having a synch output to indicate when synchronization occurs between the first graphics device and the second graphics device; and
   a controller having a first input coupled to the synch output, a second input coupled to the first graphics device, and a third input coupled to the second graphics device, and a port selector output to indicate which of the first graphics device and the second graphics device is to provide a first video output component signal to the first video port.

6. The system of claim 5, wherein:
   the first graphics device further comprises a control output coupled to the first input of the controller; and
   the second graphics device further comprises a control output coupled to the second input of the controller.

7. The system of claim 5 further comprising:
   a bus; wherein
   the first input and the second input of the controller are a common input coupled to the bus;
   the first graphics device further comprises a bus port coupled to the bus; and
   the second graphics device further comprises a bus port coupled to the bus.

8. The system of claim 7, wherein the bus is a PCI (Peripheral Component Interface) bus.

9. The system of claim 1 further comprising a monitor coupled to the first video output port.

10. A video driver system comprising:
    a first graphics device having an input and a first video component output to provide a first video output component signal;

a second graphics device having an input and a first video component output to provide a first video output component signal;

a first video output port coupled to the output of the first graphics device and the first video component output of the second graphics device;

a second video output port coupled to the first video component output of the second graphics device; and a first switch having a first input coupled to the first video component output of the first graphics device, and a second input coupled to the first video component output of the second graphics device, and an output coupled to the first video output port, wherein the first video output port is coupled to the first and second graphics devices through the first switch.

11. The system of claim 10, further comprising:

a comparator having a first input coupled to the first video output port, a second input to receive a reference signal, and an output; and a controller having a first input coupled to the comparator.

12. The system of claim 11, wherein the comparator is a voltage comparator, and the reference signal is a voltage reference signal.

13. The system of claim 11, wherein the comparator is a current comparator, and the reference signal is a current signal.

14. The system of claim 10, further comprising:

a variable reference source having an input coupled to a first output of the controller, and an output coupled to a first video output component adjust input of the second graphics device.

15. The system of claim 14, wherein the variable reference source is a current source.

16. The system of claim 10, further comprising:

a second switch, wherein the second switch has a first input coupled to the first video component output of the first graphics device, a second input coupled to the first video component output of the second graphics port, and an output coupled to a first node of a resistive element, wherein the resistive element is coupled to the first and second graphics devices through the second switch.

17. The system of claim 10 further comprising:

a second switch, having a first input coupled to the first video component output of the first graphics device, and a second input coupled to the first video component output of the second graphics port, and an output coupled to the second video output port, wherein the second video output port is coupled to the first and second graphics devices through the first switch.

18. A method of providing a video signal, the method comprising:

generating a first signal at a first device, wherein the first signal is representative of a first video output component;

providing the first signal to a first node;

determining a value of the first signal at a first output node, wherein the step of determining includes the substep of modifying and comparing the value of the first device until the value of the first signal substantially matches a predetermined value;

generating a second signal at a second device, wherein the second signal is representative of a first video output component;

providing the second signal of the second device to the first output node;

adjusting the second device until a value of the second signal at the first output node substantially matches the determined value of the first signal at the first output node;

determining a first digital value associated with the first device, wherein the value of the first signal is based on the first digital value when the first signal substantially matches the predetermined value;

providing the first digital value to the second device;

the step of providing the second signal includes providing the second signal from the second device based on the first digital value; and the step of adjusting includes adjusting the second device without changing the first digital value.

19. The method of claim 18, further comprising the step of:

removing the first signal from the first node prior to the step of providing the second signal.

20. The method of claim 18, wherein the valve of the first and second signal is a voltage value.

21. The method of claim 18, wherein the first digital value is associated with a digital to analog converter of the first device.

22. A method of providing a video signal, the method comprising:

generating a first signal at a first device, wherein the first signal is representative of a first video output component;

providing the first signal to a first node;

determining a value of the first signal at a first output node;

generating a second signal at a second device, wherein the second signal is representative of a first video output component;

providing the second signal of the second device to the first output node;

adjusting the second device until a value of the second signal at the first output node substantially matches the determined value of the first signal at the first output node;

generating a third signal at the first device, wherein the third signal is representative of a second video output component;

providing the third signal to a second output node;

determining a value of the third signal at the second output node;

generating a fourth signal at the second device, wherein the fourth signal is representative of a second video output component;

providing the fourth signal of the second device to the second output node; and adjusting the second device until a value of the fourth signal at the first node substantially matches the determined value of the third signal at the second output node.

23. The method of claim 22, wherein:

the step of adjusting the second device until a value of the fourth signal includes adjusting a signal received by the second device;

the step of adjusting the second device until a value of the fourth signal includes adjusting a color palette associated with the second device.

24. A method of providing a video signal, the method comprising:

generating a first signal and a second signal from a first device, wherein the first signal is representative of a first video output component of a first frame of video data, and the second signal is representative of a first video output component of a second frame of video data;

generating a third signal from a second device, wherein the third signal is representative of a first video output component of a third frame of video data;

providing the first signal to a first port during a first time period;

providing the third signal to the first port during a second time period, wherein the second time period is sequentially adjacent to the first time period; and providing the second signal to the first port during a third time period, wherein the third time period is sequentially adjacent to the second time period.

25. The method of claims 24, further comprising the step of:

receiving a state indicator;

wherein the steps of providing occur when the state indicator has a first state value; and when the state indicator has a second state value performing the following steps:
providing the first signal to the first port;
providing the third signal to a second port; and
providing the second signal to the first port after the step of providing the first signal to the first port.

* * * * *